UNITED STATES PATENT OFFICE.

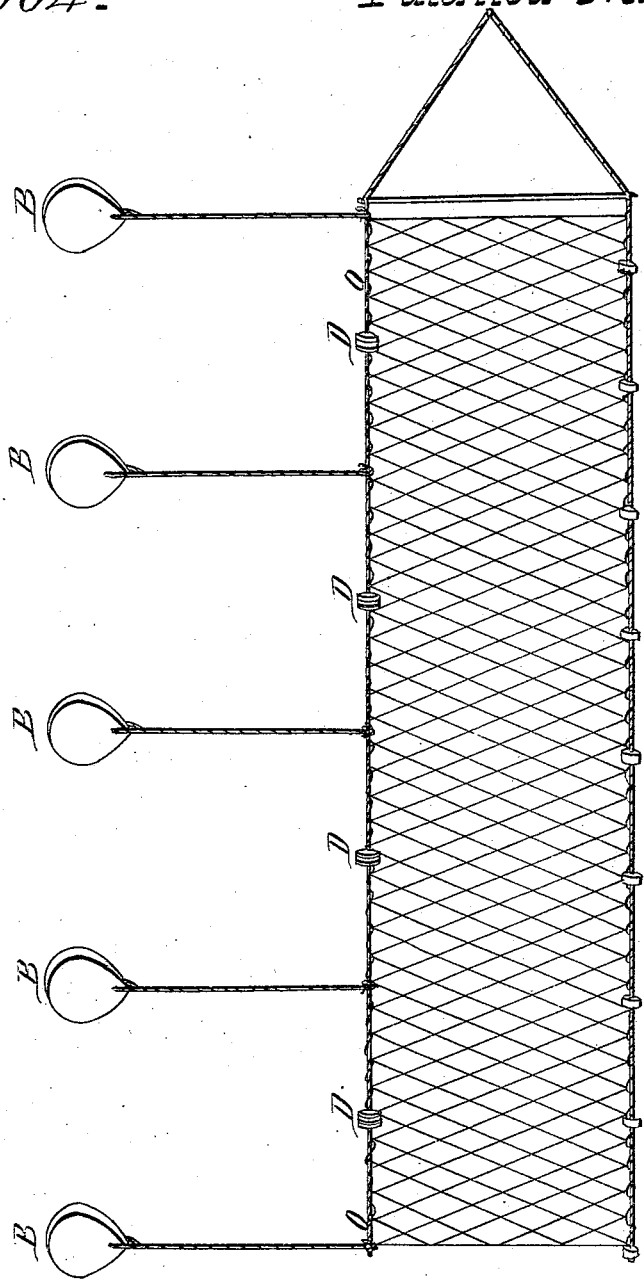

HARRIS COOK, OF HADDAM, CONNECTICUT.

IMPROVEMENT IN GILL-NETS FOR CATCHING FISH.

Specification forming part of Letters Patent No. 3,004, dated March 17, 1843.

*To all whom it may concern:*

Be it known that I, HARRIS COOK, of Haddam, in the county of Middlesex and State of Connecticut, have invented a new and Improved Mode of Protecting Gill-Nets from Injury by Vessels; and I do hereby declare that the following is a full and exact description.

The nature of my invention consists in sinking gill-nets below the surface of the water, and in retaining them in any desired altitude, effects resulting from the employment of a smaller number of corks than will float the net, lines, and leads combined and a sufficient number of buoys, which rest upon the surface of the water to keep the net from coming in contact with the bottom of the river.

To enable others skilled in the art to make and use my invention, I will proceed to describe its construction and operation.

I construct my gill-net in the usual form—viz., with net, lead-line, cork-line, leads, corks, &c.; but I employ only about one-eighth of the usual number of corks, as shown at D D D in the accompanying drawing. By this arrangement the apparatus will sink below the surface of the water, and now, to prevent it from reaching the bottom of the river, I use a number of buoys, B B B, which float upon the surface of the water, and are connected to the cork-line O severally by cords at an equal distance apart. The length of the cords may be in proportion to the depth of water, for the net will sink the length of the cords below the surface of the water, and vessels drawing less than the length of said cords can pass over the net without coming in contact with it. Thus I am enabled to fish with my net successfully and undisturbed while vessels are sailing up and down the river, and that, too, directly over the net.

What I claim as my invention, and desire to secure by Letters Patent, is—

The method herein described of sinking nets below the surface of the water to protect them from injury by the employment of a smaller number of corks than will float the net, lines, and leads, when combined with buoys resting on the surface of the water to preserve the net, &c., from sinking to the bottom, as herein described.

HARRIS COOK.

Witnesses:
 JUSTIN M. SMITH,
 WILLARD COOK.